US009153095B2

(12) United States Patent
Adiraju et al.

(10) Patent No.: US 9,153,095 B2
(45) Date of Patent: Oct. 6, 2015

(54) NEAR FIELD COMMUNICATIONS IN WAGERING GAME ENVIRONMENTS

(75) Inventors: Srinivyasa M. Adiraju, Vernon Hills, IL (US); Michael R. Bytnar, Naperville, IL (US); Craig J. Sylla, Round Lake, IL (US); Gerardus A. Weijers, Henderson, NV (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/985,801

(22) PCT Filed: Feb. 14, 2012

(86) PCT No.: PCT/US2012/025116
§ 371 (c)(1),
(2), (4) Date: Aug. 15, 2013

(87) PCT Pub. No.: WO2012/112602
PCT Pub. Date: Aug. 23, 2012

(65) Prior Publication Data

US 2013/0324237 A1 Dec. 5, 2013

Related U.S. Application Data

(60) Provisional application No. 61/443,073, filed on Feb. 15, 2011.

(51) Int. Cl.
*G06F 17/00* (2006.01)
*G07F 17/32* (2006.01)

(52) U.S. Cl.
CPC ........ *G07F 17/3225* (2013.01); *G07F 17/3223* (2013.01)

(58) Field of Classification Search
CPC .................................................. G07F 17/3225
USPC ............ 463/20, 25.29–33, 42; 482/4, 8, 901, 482/910
See application file for complete search history.

(56) References Cited

U.S. PATENT DOCUMENTS

| | | | | |
|---|---|---|---|---|
| 8,814,683 | B2 * | 8/2014 | Hollander et al. | 463/31 |
| 2008/0220878 | A1 | 9/2008 | Michaelis | |
| 2009/0124376 | A1 | 5/2009 | Kelly et al. | |
| 2010/0048291 | A1 | 2/2010 | Warkentin | |
| 2013/0337890 | A1 * | 12/2013 | Earley et al. | 463/25 |
| 2014/0045586 | A1 * | 2/2014 | Allen et al. | 463/25 |

FOREIGN PATENT DOCUMENTS

WO WO-2012112602 8/2012

OTHER PUBLICATIONS

"PCT Application No. PCT/US12/25116 International Preliminary Report on Patentability", Feb. 7, 2013 , 9 pages.
"PCT Application No. PCT/US12/25116 International Search Report", May 25, 2012 , 8 pages.

* cited by examiner

*Primary Examiner* — Ronald Laneau
(74) *Attorney, Agent, or Firm* — DeLizio Law, PLLC

(57) ABSTRACT

A method includes establishing a Near Field Communication (NFC) between a wagering game machine and a mobile device, without a manual configuration and a manual intervention. The method includes receiving, into the wagering game machine, player identification data from the mobile device through the Near Field Communication. The method includes authenticating the player identification data, wherein the authenticating is at least part of a player login into a wagering game account.

21 Claims, 10 Drawing Sheets

NEAR FIELD COMMUNICATIONS IN WAGERING GAME ENVIRONMENTS

RELATED APPLICATIONS

This application claims the priority benefit of U.S. Application Ser. No. 61/443,073 filed Feb. 15, 2011.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to near field communications in a wagering game environment.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises establishing a Near Field Communication between a wagering game machine and a mobile device, without a manual configuration and a manual intervention; receiving, into the wagering game machine, player identification data from the mobile device through the Near Field Communication; and authenticating the player identification data, wherein the authenticating is at least part of a player login into a wagering game account.

In some embodiments, a distance between the mobile device and the wagering game machine is less than 12 inches.

In some embodiments, the method further comprises downloading content into the mobile device from the wagering game machine using the Near Field Communication, after authenticating and based on the player identification data.

In some embodiments, the authenticating comprises transmitting the player identification data to a backend server that is communicatively coupled to the wagering game machine, wherein in response to the authenticating and receipt of the player identification data the backend server downloads content into the mobile device through a different wireless communication that does not include the Near Field Communication and does not include the wagering game machine.

In some embodiments, the authenticating comprises transmitting the player identification data to a backend server that is communicatively coupled to the wagering game machine, wherein the method comprises performing account-based wagering in the wagering game machine after authenticating and based on the player identification data.

In some embodiments, a method comprises receiving, into a first wagering game machine from a second wagering game machine that is adjacent to the first wagering game machine, a wireless communication to establish a wireless communication between the first wagering game machine and the second wagering game machine; establishing the wireless communication between the first wagering game machine and the second wagering game machine, without a manual configuration and a manual intervention; receiving, through the wireless communication and into the first wagering game machine, an identification of the second wagering game machine; and determining, by the first wagering game machine, a physical location of the second wagering game machine relative to the first wagering game machine based on the identification of the second wagering game machine.

In some embodiments, the first wagering game machine and the second wagering game machine are part of a bank of wagering game machines, wherein a celebration at one of the wagering game machines in the bank of wagering game machines is spread across the bank of wagering game machines, wherein the method comprises receiving, through the wireless communication into the first wagering game machine from the second wagering game machine, an identification of a type of the celebration and a time value to coordinate a timing of the celebration; and creating the celebration at the first wagering game machine in coordination with the bank of wagering game machines based on the identification of the type of celebration and the time value received through the wireless communication.

In some embodiments, the wireless communication comprises a Near Field Communication.

In some embodiments, the method further comprises receiving, through the wireless communication by the first wagering game machine and from the second wagering game machine, a network address of a host device that is storing content; receiving, through the wireless communication by the first wagering game machine and from the second wagering game machine, an instruction to download the content from the host device; and downloading, by the first wagering game machine, the content from the host device, in response to receiving the instruction and based on the network address of the host device.

In some embodiments, the downloading of the content from the host device comprises downloading of the content from the host device using a wired communication.

In some embodiments, a wagering game machine comprises a processor; a wagering game module, executable on the processor, configured to present a wagering game on which monetary value can be wagered to a wagering game player; and a communication module communicatively coupled to the processor, wherein the communication module is configured to receive, from a mobile device, a wireless communication between the wagering game machine and the mobile device based on a communication protocol wherein the mobile device and the wagering game machine are required to within 12 inches of each other; establish the wireless communication between the wagering game machine and the mobile device; and receive identification data of the wagering game player from the mobile device through the wireless communication, wherein the wagering game player is authenticated based on the identification data, wherein the authentication is at least part of a login of the wagering game player into a wagering game account.

In some embodiments, the communication protocol comprises Near Field Communication.

In some embodiments, the communication module is configured to download content into the mobile device from the wagering game machine using the wireless communication.

In some embodiments, the authentication comprises transmission of the identification data to a backend server that is communicatively coupled to the wagering game machine, wherein in response to the authentication and receipt of the identification data the backend server is configured to download content into the mobile device through a different wireless communication that does not include the wireless communication and does not include the wagering game machine.

In some embodiments, the authentication comprises transmission of the identification data to a backend server that is communicatively coupled to the wagering game machine, wherein the wagering game module is configured to perform account-based wagering in the wagering game machine after the authentication and based on the identification data.

In some embodiments, a wagering game machine comprises a processor; a wagering game module, executable on the processor, configured to present a wagering game on which monetary value can be wagered to a wagering game player; and a Near Field Communication module communicatively coupled to the processor, wherein the Near Field Communication module is configured to, receive, from a different wagering game machine that is adjacent to the wagering game machine, a wireless communication to establish a Near Field Communication between the wagering game machine and the different wagering game machine; receive, through the Near Field Communication, an identification of the different wagering game machine, wherein a physical location of the different wagering game machine is determined relative to the wagering game machine based on the identification of the different wagering game machine.

In some embodiments, the wagering game machine and the different wagering game machine are part of a bank of wagering game machines, wherein a celebration at one of the wagering game machines in the bank of wagering game machines is spread across the bank of wagering game machines, wherein the Near Field Communication module is configured to receive, through the Near Field Communication from the different wagering game machine, an identification of a type of the celebration and a time value to coordinate a timing of the celebration; and wherein the wagering game module is configured to create the celebration at the wagering game machine in coordination with the bank of wagering game machines based on the identification of the type of celebration and the time value received through the Near Field Communication.

In some embodiments, the celebration comprises at least one of sound, lighting and video.

In some embodiments, the Near Field Communication module is configured to receive, through the Near Field Communication and from the different wagering game machine, a network address of a host device that is storing content; wherein the Near Field Communication module is configured to receive, through the Near Field Communication and from the different wagering game machine, an instruction to download the content from the host device; and wherein the wagering game module is configured to download, the content from the host device, in response to receiving the instruction and based on the network address of the host device.

In some embodiments, the wagering game module is configured to download the content from the host device using a wired communication.

In some embodiments, an apparatus comprises means for establishing a Near Field Communication between a wagering game machine and a mobile device, without a manual configuration and a manual intervention; means for receiving, into the wagering game machine, player identification data from the mobile device through the Near Field Communication; and means for authenticating the player identification data, wherein the means for authenticating is at least part of a player login into a wagering game account.

In some embodiments, a distance between the mobile device and the wagering game machine is less than 12 inches.

In some embodiments, the apparatus further comprises means for downloading content into the mobile device from the wagering game machine using the Near Field Communication, after authentication and based on the identification data.

In some embodiments, the means for authenticating comprises means for transmitting the player identification data to a backend server that is communicatively coupled to the wagering game machine, wherein in response to the authentication and receipt of the player identification data the backend server downloads content into the mobile device through a different wireless communication that does not include the Near Field Communication and does not include the wagering game machine.

In some embodiments, the means for authenticating comprises means for transmitting the player identification data to a backend server that is communicatively coupled to the wagering game machine, wherein the apparatus comprises means for performing account-based wagering in the wagering game machine after authenticating and based on the player identification data.

BRIEF DESCRIPTION OF THE FIGURES

Embodiments of the invention are illustrated in the Figures of the accompanying drawings in which.

DESCRIPTION OF THE EMBODIMENTS

Figure 1:
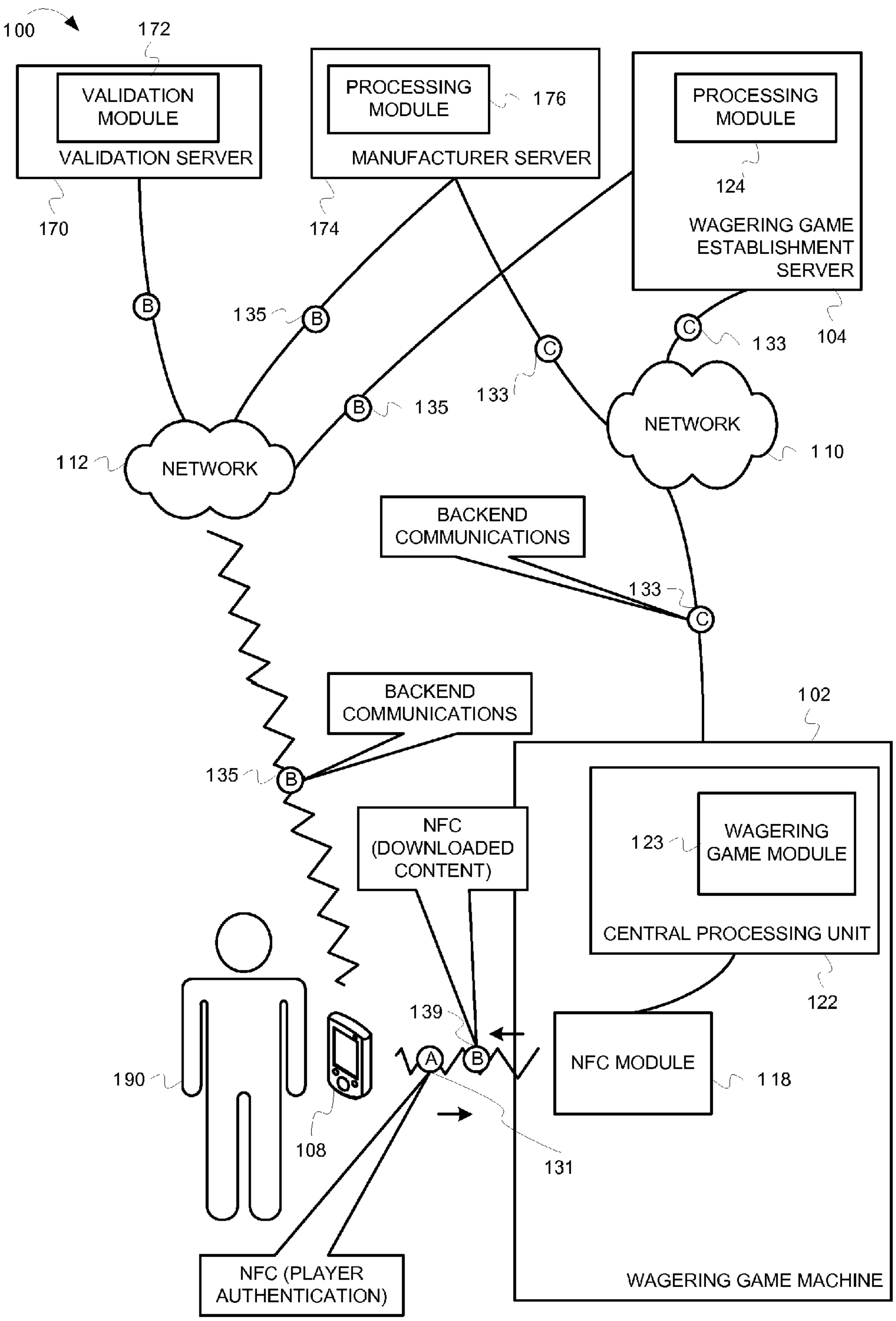
FIG. 1 depicts a wagering game system having near field communications between a mobile device and a wagering game machine for player authentication, according to some example embodiments.

This description of the embodiments is divided into seven sections. The first section provides an introduction to some example embodiments, while the second section describes example system environments. The second section is divided into three subsections. A first subsection describes NFC communication for a mobile device-to-wagering game machine configuration. A second subsection describes NFC communication for a wagering game machine-to-wagering game machine configuration. A third subsection describes NFC communication for a mobile device-to-mobile device configuration. The third section describes example operations performed by some example embodiments. The fourth section describes a wagering game machine architecture, and the fifth section describes a wagering game network. The sixth section describes an example wagering game machine and the seventh section presents some general comments.

Introduction

This section provides an introduction to some example embodiments. Some example embodiments incorporate short range wireless communication into a wagering game environment. In some example embodiments, this short range wireless communication is based on Near Field Communications (NFC). In some example embodiments, this short range wireless communication comprises infrared transmission. The range of communication can vary but is generally considered short (e.g., less than 10 centimeters, less than 20 centimeters, less than 5 centimeter, less than three feet, less than 12 inches, less than six inches, etc.). In some example embodiments, the NFC communication can be either unidirectional or bi-directional.

In contrast to other wireless communications (e.g., Bluetooth), NFC enables an automatic configuration for communication between the two devices (manual intervention is not required). For example and in contrast to Bluetooth, there is no requirement that devices be placed into a pairing mode by the user, that a certain button on the devices be held down for an extended period, etc. in order to establish the NFC communication. Rather, the two NFC compatible devices establish the NFC communication after being in close proximity to each other.

Various configurations are described herein for NFC communication in a wagering game environment. In some example embodiments, the NFC communications are between a mobile device and a wagering game machine. Such applications enable authentication of a wagering game player based on their identification and other authentication data provided by their mobile device to the wagering game machine using NFC communication. Alternatively or in addition, such applications enable various content to be downloaded into the mobile device from the wagering game machine using NFC communication. The various content can include data related to the game being played at the wagering game machine, targeted content based on identification of the wagering game player, etc.

In some other example embodiments, the NFC communication is between two wagering game machines. Such an application can use the NFC communication to identify the location of wagering game machines relative to each other. Such an application can also use the NFC communication to exchange data between the two wagering game machines. In some example embodiments because of the limited data rage of NFC communications, the amount of data exchanged can be less in comparison to the amount of data exchanged using a wired high bandwidth communication (e.g., Ethernet). In some applications, the NFC communication is used in conjunction with such higher bandwidth communications for communications between two wagering game machines (as further described below). For example, the NFC communication can be used to transmit a network address from which content can be downloaded using the higher bandwidth communications. In another example, the NFC communication can be used to transmit some type of activation flag to activate an operation based on data that is already residing on machine-readable media of the wagering game machine and/or an operation to perform the download of content from a host (based on the network address provided over the NFC communication). For example, the NFC communication can be used within a bank of wagering game machines to coordinate celebrations, attraction content, etc.

In some other example embodiments, the NFC communication is between two mobile devices. In some applications, these two mobile devices are associated with two different wagering game players playing at two adjacent wagering game machines.

While these different applications are separately described, in some example embodiments, such applications for NFC communications can be combined. For example, the mobile device-to-wagering game machine application can be used with the mobile device-to-mobile device application. In another example, the mobile device-to-wagering game machine application can be used with the wagering game machine-to-wagering game machine application.

In some example embodiments, the NFC communication is based on a standard defined by International Organization for Standardization (ISO)/International Electrotechnical Commission (IEC) 18092/European Computer Manufacturers Association (ECMA)-340 (Near Field Communication Interface and Protocol-1 (NFCIP-1)) or ISO/IEC 21481/ECMA-352 (Near Field Communication Interface and Protocol-2 (NFCIP-2)). Because of the short range of communication, the two devices are required to be physically close together. Also, this physically proximity requirement of NFC communication typically ensures that the owner of the mobile device (e.g., a wagering game player) is physically present at the location where the other device (e.g., a wagering game machine) is located. Therefore, the use of NFC provides a security of the communication because of its short range, which is particularly important in a wagering game environment.

Also, the ease of use of NFC communication (because of the automatic configuration between the two devices) is particularly useful in a wagering game environment. Specifically, the technical savviness of patrons at a wagering game establishment can range significantly (none to extensive knowledge). Successful incorporation of a new feature into a wagering game environment needs to account for these varying groups of patrons. Incorporation of NFC communication, in accordance with some example embodiments described herein, does account for these varying groups of patrons. In particular, the NFC communication enables the patrons that are the least savvy to be able to use this communication in at a wagering game establishment (as further described below).

Also, in contrast to other short range communications (e.g., Bluetooth), a usage model for NFC is generally communication for a short duration. NFC communication enables a mobile device of a wagering game player to easily and securely communicate with any number of wagering game machines in a wagering game establishment. There is no requirement of manual configuration each time a wagering game player attempts to configure their mobile device to communicate with a new wagering game machine. The wagering game player only needs to bring the mobile device near the wagering game machine to complete the pairing between the two to enable communication. Also, in contrast to Radio-Frequency Identification (RFID) configurations, the NFC communication is integrated into the hardware of the mobile device and the wagering game machine. In particular, the RFID is generally used for supply chain management, wherein an electronic tag is externally or internally positioned on the object or device being tracked. Then some type of RFID reader reads the electronic tag. The RFID is not integrated into the hardware of the device.

System Environments

This section describes various system environments of some example embodiments. This section includes various configurations for near field communications in a wagering game environment. The section will discuss FIG. 1-4. The discussion of FIG. 1 will describe a system that includes near field communications between a mobile device and a wagering game machine for different types of communications there between (e.g., player identification, game-related content, etc.). The discussion of FIGS. 2-3 will describe a system that includes near field communication between two different wagering game machines. The discussion of FIG. 4 will describe a system that includes near field communication between two different mobile devices.

Mobile Device to Wagering Game Machine

FIG. 1 depicts a wagering game system having near field communications between a mobile device and a wagering game machine for player authentication, according to some example embodiments. In particular, FIG. 1 depicts a system 100 that includes a wagering game machine 102, a mobile device 108 and a number of backend servers (a wagering game establishment server 104, a manufacturer server 174, and a validation server 170). The mobile device 108 is associated with and used by a wagering game player 190. In this embodiment, the mobile device 108 stores user identification of the wagering game player 190 (e.g., user's actual name, username, etc.).

In this example configuration, the different backend servers are controlled by different entities. The wagering game establishment server 104 is a server that is controlled by the wagering game establishment that includes the wagering game machine 102. The wagering game establishment server 104 includes a processing module 124, which can be software, firmware, hardware or a combination thereof. As further described below, the processing module 126 can receive and store various data from the wagering game machine 102. The processing module 126 can also download various content (e.g., configuration, authorization for different activities, etc.) into the wagering game machine 102. The processing module 126 can be used for account-based wagering, as further described below. The manufacturer server 174 is a server that is controlled by the manufacturer and developer of the wagering game machine 102. The manufacturer server 174 includes a processing module 176, which can be software, firmware, hardware or a combination thereof. The processing module 176 is configured to process requests for storing and providing data. For example in one application, the processing module 176 can be configured to enable a wagering game player to login into a player account, access and/or store on the player account, etc. In this example configuration, the manufacturer server 174 can be a server that is external to the wagering game establishment that includes the wagering game machine 102.

The validation server 170 includes a validation module 172, which can be software, firmware, hardware or a combination thereof. In this example configuration, the validation server 106 can be a server that is external to the wagering game establishment that includes the wagering game machine 102. The validation module 128 is to validate mobile payments and mobile credits for a mobile device. The validation server 106 can be controlled by the service provider of the mobile service, a financial institution that is controlling the electronic funds associated with the mobile payments and mobile credits, etc.

The system 100 also includes a network 110 and a network 112. The wagering game player 108 has positioned the mobile device 108 close enough to the wagering game machine to establish NFC communication there between. The mobile device 108 is also wirelessly communicatively coupled to the network 112. For example, the mobile device 108 can be communicatively coupled to the network 112 using radio communications (e.g., Global System for Mobile Communications (GSM), Code Division Multiples Access (CDMA), etc.). The wagering game establishment server 104, the manufacturer server 174, and the wagering game machine 102 are communicatively coupled to the network 110. The validation server 170 and the manufacturer server 174 are communicatively coupled to the network 112.

As shown, there are a number of backend communications in the system 100. In FIG. 1, there are backend communications 133 between the wagering game machine 102 and the wagering game establishment server 104 over the network 110. The backend communications 133 can also be between the wagering game machine 102 and the manufacturer server 174 over the network 110. Different examples of the backend communications 133 are described below.

Backend communications 135 can also occur over the network 112 between the mobile device 108 and any of the backend servers (the validation server 170, the manufacturer server 174, and the wagering game establishment server 104). Different examples of the backend communications 135 are described below.

Figure 5:
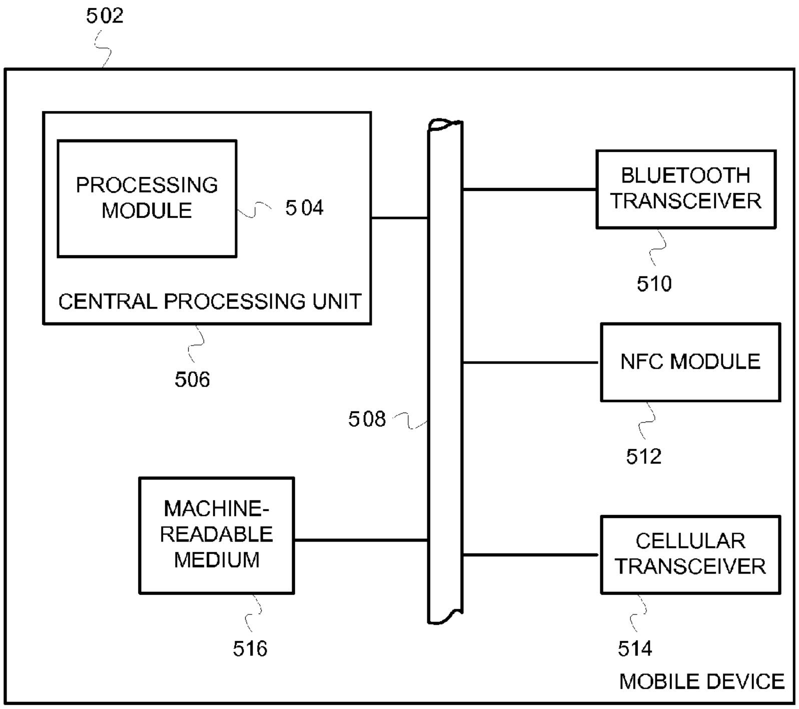
FIG. 5 depicts a more detailed block diagram of a mobile device, according to some example embodiments.

The wagering game machine 102 includes a central processing unit 122 that is configured to execute a wagering game module 123. The wagering game machine 102 also includes an NFC module 118 for receiving and transmitting NFC communications. In this example, the NFC module 118 is receiving and transmitting communications over an NFC communication established with a different NFC module in the mobile device 108. The range of communication of NFC can vary but is generally considered short (e.g., less than 10 centimeters, less than 20 centimeters, less than 5 centimeter, etc.). In contrast to other wireless communications (e.g., Bluetooth), NFC enables an automatic configuration for communication between the two devices (manual intervention is not required). In some example embodiments, the NFC communication is bi-directional. Accordingly, the mobile device 108 can upload data into the wagering game machine 102 and the wagering game machine 102 can download data into the mobile device 108 using the NFC communication. A more detailed diagram of a mobile device having an NFC module is illustrated in FIG. 5, which is described below.

The NFC module 118 is communicatively coupled to the central processing unit 122. Accordingly, the wagering game module 123 can receive and process the different NFC communications received and can transmit content through the NFC communication using the NFC module 118. In some example embodiments, the wagering game player 190 can be identified using the mobile device 108 through NFC communication between the player's mobile device 108 and the wagering game machine 102 (see communication 131). For example, the NFC communication can be used as part of a login of the player into one or more different types of accounts. For example, the player can have a first account for the wagering game establishment and a second account for the manufacturer of the wagering game machine 102. In some applications, a same player login can be used login into these multiple accounts. Alternatively, different logins can be required for these different accounts. In some example embodiments, the mobile device 108 can store the player identification for the one or more accounts. Using the NFC communication, the communication 131 can be an identification of the player that is stored on a machine-readable medium therein. Alternatively or in addition, the wagering game player 190 can input a username, password, etc. into the mobile device 108 as part of the player login into the wagering game machine 102.

In some example embodiments, the player identification, password, etc. using NFC communication can be used to enable player login for account-based wagering. Accordingly, after a player login, the player can authorize a given dollar amount to be wagered using the player's account. The wagering game machine 102 can then enable wagering game play based on a player's account managed by the wagering game establishment server 104. After a game play, the wagering game machine 102 can transmit a communication back to the wagering game establishment server 104 to report wins and losses. The wagering game establishment server 104 can then update the player's account based on this communication.

Alternatively or in addition, after player login, the mobile device 108 can communicate with one of the backend servers (independent of the wagering game machine) over the network 112—see backend communications 135. This communication can provide the authorization for downloading wagering game credit from the player's account to the mobile device 108. This player account can be controlled in the wagering game establishment server 104. Accordingly, the wagering game establishment server 104 can download the wagering game credit over the network 112 to the mobile device 108. The NFC communication between the mobile device 108 and the wagering game machine 102 can then be used to transfer the wagering game credit to the wagering game machine 102. In some example embodiments, the mobile device 108 can be configured to receive a mobile credit from the validation server 170. This mobile credit can be from a financial institution, from the player's mobile wallet, etc. Once the mobile credit is in the mobile device 108, the NFC communication between the mobile device 108 and the wagering game machine 102 can then be used to transfer the mobile credit to the wagering game machine 102 for wagering game play.

This NFC communication (communication 131) can be used as part a login of the player into a player account for the manufacturer of the wagering game machine to enable adaptive game play. In another example, this NFC communication (communication 131) can be used as part a login of the player into a player account for the wagering game establishment for player tracking, loyalty rewards, etc.

The NFC communication (communication 131) between the mobile device 108 and the wagering game machine 102 is not limited to mobile devices of wagering game players. For example in some example embodiments, NFC communication is used to identify operators at the wagering game establishment, a field technician employed by the manufacturer of the wagering game machine, etc. For example, an operator at the wagering game establishment can use NFC communication through the mobile device 108 to login to the wagering game machine 102 to access operator menus for maintenance of the wagering game machine 102. This user identification provided by the NFC communication can provide different privileges for access to the wagering game machine 102 depending on whether the user is accessing as a player or an operator, field technician, etc. For example, after receipt of the user identification, the wagering game machine 102 can communicate with the wagering game establishment server 104 to determine whether the user is currently working at the wagering game establishment (depending on the date, time, etc.). The wagering game establishment server 104 can then provide the level of access for the user back to the wagering game machine 102. The wagering game machine 102 can then provide the user access based on the level of access provided by the wagering game establishment server 104. These different levels of access can be for different components of the wagering game machine 102 (e.g., software access, mechanical or electro-mechanical locks for different parts of the machine, etc.).

In some example embodiments, the NFC communication (communication 131) can be used to transmit mobile payment from the mobile device 108 to the wagering game machine 102 for wagering game credit. The mobile payment can be based on monetary amounts locally stored on the mobile device 108. Alternatively or in addition, the monetary amounts can be downloaded from the validation server 170 (see description of the validation server 170 above). The NFC communication can be used to transmit mobile credit from the wagering game machine 102 to the mobile device 108 as part of a cash-out operation from the wagering game machine 102. This mobile credit can be stored in the mobile device 108 and/or uploaded to the validation server 170 over the network 112 for storage therein.

In some example embodiments, the NFC communication is bi-directional between the mobile device 108 and the wagering game machine 102—see communication 139 wherein content is downloaded from the wagering game machine 102 into the mobile device 108. The content being downloaded can be both static and dynamic content. For example, if the wagering game player 190 is playing game A, the wagering game machine 102 can download content specific to the game A (pay tables, help content, etc.) through the NFC communication. The help content can include any combination of text, audio and video. For example, the help content can include a video to assist the wagering game player 190 in how to play a bonus round of the wagering game. Dynamic content can include game play statistics, leader boards, achievements earned by the player or friends of the player, amount of money put into the machine versus the amount of money won, etc.

This downloaded content can originate from the wagering game establishment server 104 or the wagering game machine 102. In some example embodiments, the content can be downloaded into the mobile device 108 over the network 112 without the wagering game machine 102. Accordingly, using the NFC communication, the wagering game machine 102 can download an identification of the game being played into the mobile device 108. Based on this identification, the mobile device 108 can request this content directly from the wagering game establishment server 104 (instead of being received from the wagering game machine 102 through the NFC communication). In some example embodiments, the wagering game is transferred onto the mobile device 108 for play thereon. The wagering game can also be downloaded directly from the wagering game establishment server 104 over the network 112 or from the wagering game machine 102 using the NFC communication.

In some example embodiments, the NFC communication for player identification for authorization can be used in conjunction with a player card that is scanned by a scanner of the wagering game machine 102 (not shown in FIG. 1). Accordingly, the NFC communication providing the player identification provides an additional layer of security. Alternatively, the NFC communication for player identification for authorization can be used in place of a player card.

In some example embodiments, the NFC communication can be used to enable another type of communication between the mobile device 108 and the wagering game machine 102. For example, the NFC communication can be used to exchange data to configure the pairing of the mobile device 108 and the wagering game machine 102 for Bluetooth communication. The data can include the parameters for the communication, password, secret key, etc. Subsequently, the Bluetooth communication can be used to provide communication between the mobile device 108 and the wagering game machine 102. For example, the Bluetooth communication can be used to provide mobile payments into the wagering game machine 102 from the mobile device 108; used to provide mobile credits into the mobile device 108 from the wagering game machine 102 as part of a cash-out operation; used to provide player login, etc. Such an application can enable short distance, short duration communication for auto-configuring of the Bluetooth communication. Subsequently, the wagering game player 190 would not be required to position the mobile device 108 as close to the wagering game machine 102 as can be required for NFC communication. For example, the wagering game player 190 can move the mobile device 108 back to their pocket, purse, etc. after the NFC communication is complete and Bluetooth communication has been established.

In some example embodiments, the NFC communication can be used for tracking a player's position in the wagering game establishment based on the position of the player's mobile device. For example, the NFC communication can be used for geo-tracking to enable players to win awards on one of their player accounts (e.g., a player account stored in the manufacturer server 174). In particular, the NFC communication can be used to define the player's position in a wagering game establishment based on their mobile device 108. Once the NFC communication is exchanged between the player's mobile device 108 and the wagering game machine 102, an indication that the wagering game player 190 was at the wagering game machine can be transmitted to one of the backend servers (e.g., the manufacturer server 174) that is tracking the movement of the player for geotracking applications. This communication can be transmitted by the mobile device 108 or the wagering game machine 102. For example, if the player is physically located at five different types of wagering game machines within a given period of time based on geo-tracking (using NFC communication), the player wins an award stored on their player account.

The NFC communication can be used for other applications that track the player's position in the wagering game establishment. For example in another application, if a wagering game player orders a drink and they move to a different wagering game machine, the waiter can locate the player's new location based on this NFC communication. The use of NFC communication for player tracking in a wagering game establishment is typically better than other conventional techniques, because of its level of granularity relative to a physical stationary location (e.g., specific wagering game machine). In particular, Global Positioning System (GPS) can have a good granularity but does not typically work well in a wagering game establishment because of the amount of communication interference within a wagering game establishment for GPS communication.

In some example embodiments, the wagering game machine 102 can include a mobile device holder, shelf or rack in communication range of the NFC module 118 in the wagering game machine 102. Accordingly, the wagering game player 190 is not required to physically hold the mobile device 108 while the NFC communication is occurring. Alternatively or in addition, the wagering game machine 102 can include a grip pad for an essentially horizontal surface to hold the mobile device 108. In some example embodiments, the wagering game machine 102 can include a rechargeable pad on ones of its essentially horizontal surfaces. The rechargeable pad provides a wireless transfer of power to devices positioned thereon. This surface can also be in communication range of the NFC module 118 in the wagering game machine 102. Such a configuration serves multiple purposes. In particular, the NFC communication can be occurring while the mobile device 108 is charging on the rechargeable mat. In some example embodiments, the wagering game machine 102 and/or the mobile device 108 can include a "presence" indicator (e.g., a light, display on the screen, etc.) to inform the wagering game player 190 when the NFC communication is occurring.

In some example embodiments, the NFC communication can be used to "pickpocket" data from the mobile device 108 and provide to the wagering game machine 102. For example, the data about the owner of the mobile device 108 can be pulled from the mobile device 108 through the NFC communication to push targeted data (e.g., advertising content) back to the mobile device 108. This targeted data can be downloaded to the mobile device 108 through the NFC communication 139 or other wireless communication (that does not include the wagering game machine 102). In particular the "pickpocketed" data can be provided to the wagering game establishment server 104. The wagering game establishment server 104 can then wirelessly transmit data back to the mobile device 108 over the network 112. Examples of "pickpocketed" data can also include musicians or stars the owner likes, types of food or restaurants, types of games, etc. For example, if the "pickpocketed" data indicates that the wagering game player likes a certain entertainer that has a show at the wagering game establishment, the targeted data can include advertising about the show, discounted tickets, etc.

In some example embodiments, the mobile device 108 can be used to store mobile credit in the form of an electronic ticket that can be used for redemption in the wagering game establishment. For example, the NFC communication can be used to transmit the money cashed out from a wagering game machine 102 onto the mobile device 108. The money can be represented as an electronic ticket that can be displayed on the mobile device 108. The redemption device at the wagering game establishment can scan the electronic ticket to determine the amount of money to be provided to the wagering game player 190. The electronic ticket can also be used to purchase item in a gift store or dinner at a restaurant at the wagering game establishment. Accordingly, the gift store or restaurant can have a scanning device to credit based on the monetary value of the electronic ticket. The electronic ticket can also be used to provide a mobile credit to a wagering game player's bank account, credit card account, etc.

In some example embodiments, the NFC communication can be used to provide various gaming data (player statistics, game play profiling, marketing analysis, etc.) from the wagering game machine 102 back to one of the backend servers without using the network 110. In particular, the gaming data can be pulled from the wagering game machine 102 to the mobile device 108 using the NFC communication. This data can then be uploaded to a backend server from the mobile device 108 using a cellular or WiFi connection.

In some example embodiments, the NFC communication between a wagering game player's mobile device and different wagering game machines can provide a history of games that the player has visited or walked near. Accordingly, models of commonality between the themes on the wagering game machines can be determined. Also, models regarding the amount of time spent at each theme can be determined. Such modeling can create player profiles (which themes are eye-catchers, which themes are part of a player's preferred genre, etc.). Models can also be created regarding which players are physically playing next to each other (types of persons playing types of genres relative to other persons). Such modeling enables bettering comps, offers, etc. that are tailored to the wagering game player. For example, based on the modeling, a wagering game player can be offer a comp to a first type of entertainment instead of a second type of entertainment. Other embodiments can include additional NFC communication sensor configurations. For example, an additional NFC device can identify an attached topbox or presentation unit (e.g., large screen monitor, mechanical accessory, etc.) for the wagering game machine.

Wagering Game Machine to Wagering Game Machine

Figure 2:
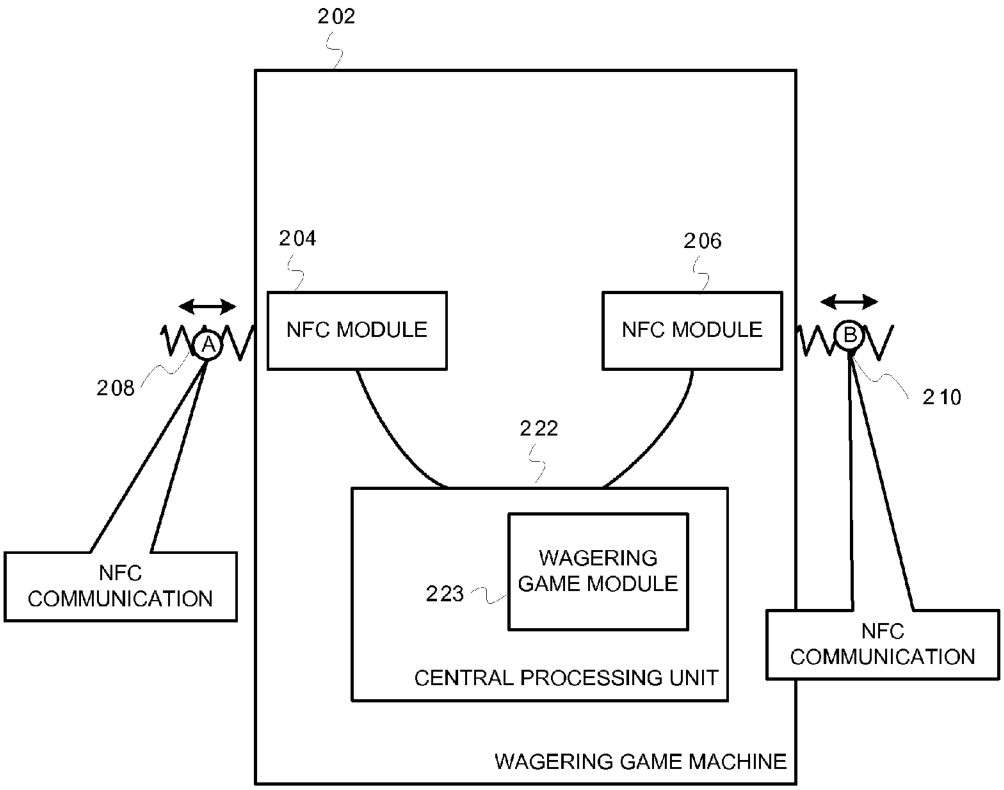
FIG. 2 depicts a more detailed block diagram of a wagering game machine having NFC communication for wagering game machine to wagering game machine communication, according to some example embodiments.

In some example embodiments, NFC communication can occur between two wagering game machines. FIG. 2 depicts a more detailed block diagram of a wagering game machine having NFC communication for wagering game machine to wagering game machine communication, according to some example embodiments. In particular, FIG. 2 depicts a wagering game machine 202 having multiple NFC modules such that NFC communication can be established between wagering game machines. In particular, the wagering game machines are physically located next to each other (based on a defined distance) to enable the NFC communication. For example, depending on the communication strength of the NFC modules in the wagering game machines, the distance between two wagering game machines is less than three feet, less than 12 inches, less than six inches, etc. As shown, the wagering game machine 202 includes two NFC modules (an NFC module 204 and an NFC module 206). In this application, the two NFC modules are positioned within on the left and right side of the wagering game machine 202. The NFC module 204 is positioned on the left side of the wagering game machine 202, and the NFC module 206 is positioned on the right side of the wagering game machine 202.

Figure 3:
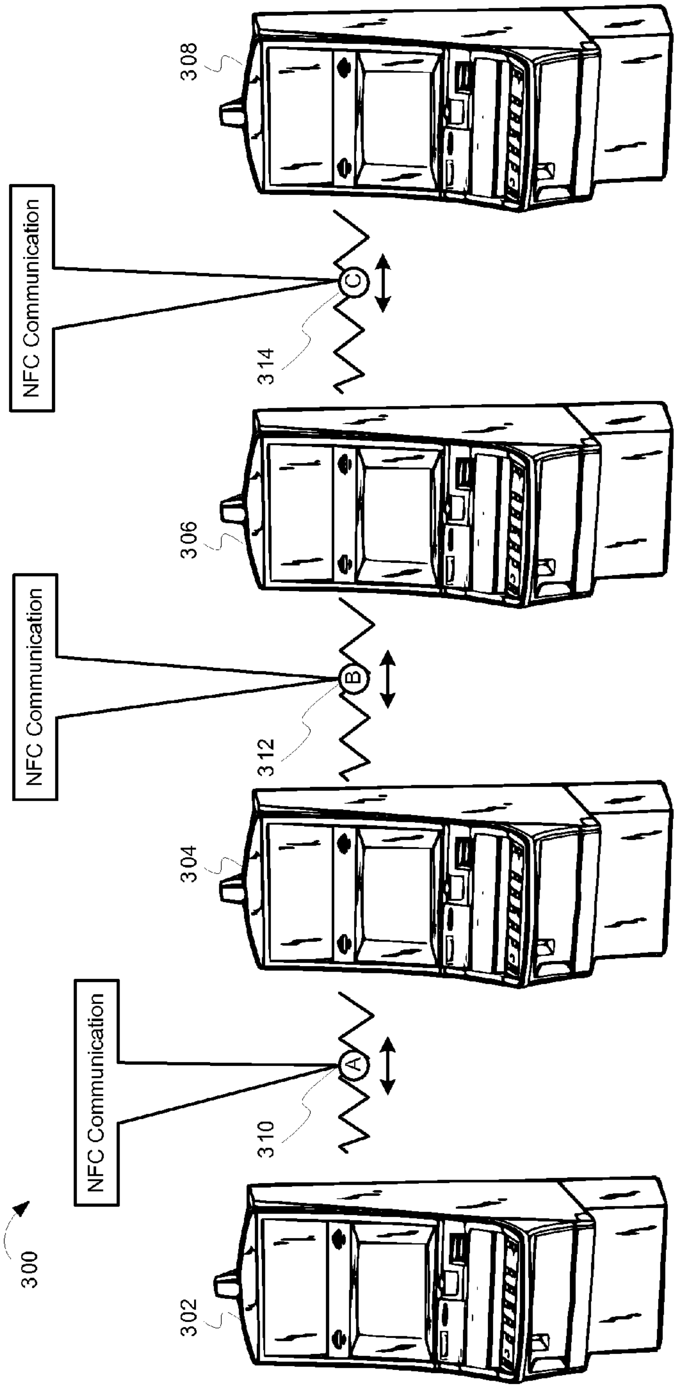
FIG. 3 depicts a bank of wagering game machines that uses NFC communication for wagering game machine to wagering game machine communication, according to some example embodiments.

The wagering game machine 202 includes a central processing unit 222 that is configured to execute a wagering game module 223. The NFC module 204 and the NFC module 206 are communicatively coupled to the central processing unit 222. Accordingly, the wagering game module 223 can receive and process the different NFC communications received and can transmit content through the NFC communication using the NFC module 204 and the NFC module 206. As shown, the NFC module 204 establishes an NFC communication 208 with another wagering game machine on its left side (not shown in FIG. 2). Also, the NFC module 206 establishes an NFC communication 210 with another wagering game machine on its right side (not shown in FIG. 2). FIG. 3, which is described below, depicts multiple wagering games machines having NFC communication.

While described as having an NFC module on the left side and an NFC module on the right side, in some other applications, more or less NFC modules can be positioned in the wagering game machine 202 to enable wagering game machine to wagering game machine NFC communication. For example, another NFC module can be positioned on the back side of the wagering game machine 202 to provide NFC communication with a wagering game machine positioned behind the wagering game machine 202.

FIG. 3 depicts a bank of wagering game machines that uses NFC communication for wagering game machine to wagering game machine communication, according to some example embodiments. FIG. 3 depicts a bank of wagering game machines 300. The bank of wagering game machines 300 includes a wagering game machine 302, a wagering game machine 304, a wagering game machine 306, and a wagering game machine 308. These different wagering game machines 300 may or may not be related. For example, these different wagering game machines can be executing a same wagering game, wherein there is a progressive jackpot that is associated with these different wagering game machines. Alternatively or in addition, these wagering game machines can be executing a same themed wagering game (e.g., Monopoly®) that may or may not share a progressive jackpot. In some example embodiments, the wagering game machine 302, the wagering game machine 304, the wagering game machine 306, and the wagering game machine 308 are two NFC modules as shown in FIG. 2. Accordingly, an NFC module of one wagering game machine can communicate (using NFC communication) with an NFC module of a second wagering game machine that is adjacent thereto.

In this example configuration, the right side NFC module of the wagering game machine 302 has established an NFC communication 310 with the left side NFC module of the wagering game machine 304. The NFC communication 310 can be bidirectional. The right side NFC module of the wagering game machine 304 has established an NFC communication 312 with the left side NFC module of the wagering game machine 306. The NFC communication 312 can also be bidirectional. The right side NFC module of the wagering game machine 306 has established an NFC communication 314 with the left side NFC module of the wagering game machine 308. The NFC communication 314 can also be bidirectional. While the bank of wagering game machines 300 is shown in a straight line, in some other example embodiments, the bank of wagering game machine 300 can be in a circle. The NFC communications 310, 312, and 314 can be established and used at different times and for different applications.

The NFC communications between two wagering game machines can be different types of information. One type of information is the identification of the wagering game machine itself. In some example embodiments, these NFC communications between wagering game machines can be used to identify the location of wagering game machines relative to each other. In particular, these NFC communications can be used to identify the location of multiple wagering game machines in the bank of wagering game machines 300. These NFC communications can be used for celebrations that are across an entire bank of wagering game machines. These celebrations can be for a big jackpot win at one or more of the wagering game machines. These celebrations can include a correlation of sounds, lighting, video (e.g., animation), etc. For example, the sounds, lighting, animation, etc. can start at one end of the bank of wagering game machines 300. The sounds, lighting, animation etc. can then move across each machine in the order they are positioned relative to each other. For example, if there is a jackpot win at one of the wagering game machines, the sounds, lighting, animation, etc. celebrating the jackpot can start at the wagering game machine 302.

The NFC communications 310, 312, and 314 can coordinate an identification of the type of celebration and the timing of the celebration so that the sounds, lighting, animation, etc. continue at the adjacent wagering game machine. In particular, the NFC communications are generally considered low bandwidth relative to other types of communication links. Accordingly, the NFC communications can be used to transmit alphanumeric encoded values to provide an identification of the celebration and time values. The actual content for the celebration can be stored in a local machine-readable media in the wagering game machines. For example, the actual content can include the sounds, the animations, the lighting sequences, etc. To illustrate, the NFC communications can transmit an encoded value of 0x1111 for a first type of celebration and an encoded value of 0x0111 for a second type of celebration, etc. These encoded values can be decoded by the wagering game machine to determine the type of celebration. The time values can be values relative to when the time values were sent, absolute time, etc.

Therefore, the wagering game machine 302 can transmit encoded values through the NFC communication 310 that include an identification of the type of celebration and a time when the celebration is to begin on the wagering game machine 304. The wagering game machine 304 can transmit encoded values through the NFC communication 312 that include an identification of the type of celebration and a time when the celebration is to begin on the wagering game machine 306. The wagering game machine 306 can transmit encoded values through the NFC communication 314 that include an identification of the type of celebration and a time when the celebration is to begin on the wagering game machine 308. These NFC communications can be transmitted prior or during the celebration.

As described, the NFC communications among a bank of wagering game machines is especially useful if one of the wagering game machines is replaced or if the wagering game machines in the bank are relocated in the bank. In particular, the NFC communications can be used to easily identify the positions of the wagering game machines after any replacements or any changes in position. In contrast to other types of communications (e.g., Ethernet, WiFi, etc.), NFC communications can provide a physical location relative to other wagering game machines.

In some example embodiments, based on knowing the physical location, the celebrations can be configured across the multiple wagering game machines based on whether wagering game play is occurring on the different wagering game machines. For example, assume the wagering game machine 302, the wagering game machine 304, and the wagering game machine 308 are being actively played (and the wagering game machine 306 is not). If a celebration is to occur across the four different wagering game machines, the celebration at the wagering game machine 306 can be skipped or muted. In another application, assume that all of the wagering game machines are idle. The NFC communication can be used to coordinate the attract screens across the different wagering game machines. In this application, the NFC communication can be used to communicate an identification that a wagering game machine is idle. Once all of the wagering game machines are broadcasting this identification, the attract screens across the different wagering game machines could be coordinated using an identification of the type of attract screen and the timing signals through the NFC communication (similar to the application described above).

Another type of information that can be transferred using NFC communication is an instruction to the wagering game machine to obtain its configuration data and the network address of the machine that is hosting the configuration data. For example, the instruction can cause the wagering game machine to obtain its configuration from one of its neighboring wagering game machine. Accordingly, this information can include a network address of the neighboring wagering game machine. In response, the wagering game machine can download its configuration from its neighboring wagering game machine using a different and higher bandwidth network communication (e.g., Ethernet). In some example embodiments, a mobile device (e.g., cellular telephone, laptop computer, etc.) with suitable NFC communication capability and suitable applications can be used. In particular, the mobile device can load configuration data to a wagering game machine using the NFC communication. In some example embodiments, this functionality for NFC communication for loading configuration data into a wagering game machine can be disabled once contact has been made with a backend server (e.g., the wagering game establishment server 104 of FIG. 1).

In some applications, NFC communication can be used to configure unconfigured wagering game machines in a bank. For example, a separate machine (not a wagering game machine, such as a laptop computer) can download configuration to the wagering game machine 302 (using some type of wired or wireless communication). After its configuration is completed, the wagering game machine 302 can transmit an instruction over the NFC communication 310 to the wagering game machine 304. The communication can include the network address of the wagering game machine 302 and an instruction to download its configuration data over an Ethernet connection from the wagering game machine 302. After its configuration is completed, the wagering game machine 304 can transmit an instruction over the NFC communication 312 to the wagering game machine 306. The communication can include the network address of the wagering game machine 304 and an instruction to download its configuration data over an Ethernet connection from the wagering game machine 304. After its configuration is completed, the wagering game machine 306 can transmit an instruction over the NFC communication 314 to the wagering game machine 308. The communication can include the network address of the wagering game machine 306 and an instruction to download its configuration data over an Ethernet connection from the wagering game machine 306.

Other types of information can be exchanged between two adjacent wagering game machines using NFC communication. For example, the wagering game machines can exchange data defining different types of attributes about the wagering game machine (e.g., an identifier for the theme of the game being played on the wagering game machine, an identifier for the serial number of the wagering game machine, an identifier of a version of the operating system being executed on the wagering game machine, etc.).

In some example embodiments, a topology model/map may be derived using the sensory positioning output of the wagering game machines. The topology may associate wagering game machine that are nearby each other via other means (e.g. WiFi signal strengths or other positional methods) and associate this information with the NFC information for positional arrangement. In some example embodiments, use of “trace” methods may reveal gateway interconnectivity which may also improve the topology grouping of wagering game machines. When used in conjunction with NFC communication, a physical, ordered grouping of wagering game machine may then be represented graphically. In some example embodiments, if an operator or technician logs into a wagering game machine or "checks in" with a NFC-based device, the operator or technician may be represented graphically on a topology map. This application can be useful for security purposes.

Mobile Device to Mobile Device

Figure 4:
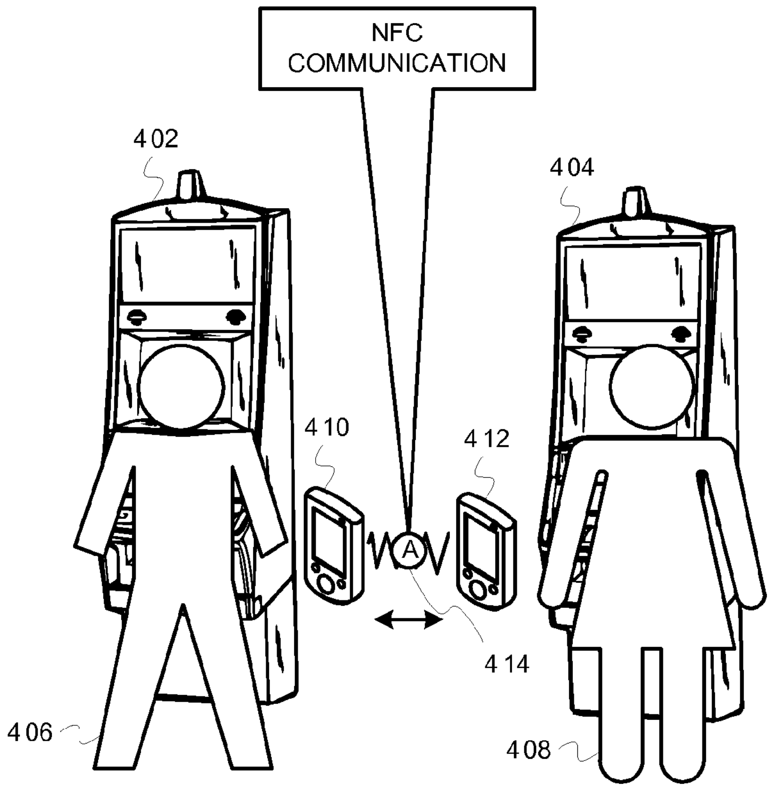
FIG. 4 depicts a wagering game system having near field communication between two mobile devices, according to some example embodiments.

In some example embodiments, the NFC communication can be between two mobile devices. FIG. 4 depicts a wagering game system having near field communication between two mobile devices, according to some example embodiments. In this example configuration, the two mobile devices are associated with two wagering game player that are playing adjacent wagering game machines. A wagering game machine 402 is positioned to the left of the wagering game machine 404. A wagering game player 406 is playing the wagering game machine 402, and a wagering game player 408 is playing the wagering game machine 404. The wagering game player 406 has a mobile device 410. The wagering game player 408 has a mobile device 412. In operation, an NFC communication has been established between the mobile device 410 and the mobile device 412 based on NFC modules within the mobile devices 410 and 412. A more detailed diagram of a mobile device having an NFC module is illustrated in FIG. 5, which is described below.

The wagering game players 406-408 can connect their mobile devices 410-412 through NFC communication by positioning the mobile devices 410-412 in close proximity to each other (no user or manual intervention required). If the two wagering game players are friends in some type of online account, there can be some sharing between the two during game play. For example, assume that the wagering game player 406 has used their mobile device 410 to perform an NFC communication with the wagering game machine 402 and that the wagering game player 408 has used their mobile device 412 to perform an NFC communication with the wagering game machine 404. Also, assume that an NFC communication has been established between the mobile device 410 and the mobile device 412.

The wagering game machines 402-404 and/or one of the backend servers (e.g., the wagering game establishment server 104 of FIG. 1) can be instructed of this relationship between two adjacent wagering game players. Accordingly, the two wagering game players can celebrate bonuses together, can play head-to-head games against each other. In some example embodiments, the backend server can recommend a communal game to the two players that they can play at two other different wagering game machines. In some applications, if the two players accept an option to play the communal game, the backend server can reserve these other two wagering game machines for a defined period (e.g., five minutes). In some example embodiments, the reservation costs the two players a certain monetary amount.

Example Mobile Device

FIG. 5 depicts a more detailed block diagram of a mobile device, according to some example embodiments. In particular, FIG. 5 illustrates the relevant components for various types of wireless communications in a mobile device, according to some example embodiments. FIG. 5 depicts a mobile device 502 that includes a Bluetooth transceiver 510, an NFC module 512, a cellular transceiver 514, a central processing unit 506, and a machine-readable medium 516 that are communicatively coupled together through a communications bus 508. The central processing unit 506 also includes a processing module 504 executing therein. The processing module 504 can be software, firmware, hardware, or a combination thereof. The processing module 504 can process the different communications transmitted and received from and to the Bluetooth transceiver 510, the NFC module 512, and the cellular transceiver 514. The machine-readable medium 516 can be representative of either or both volatile and non-volatile machine readable media. The machine-readable medium 516 can store an owner identification for the player associated with the mobile device 502 to enable player login and authentication into a wagering game machine (as described above).

The NFC module 512 can provide NFC communications with the mobile device. For example, there can be NFC communications between the mobile device 502 and a wagering game machine, between the mobile device 502 and another mobile device, etc. The NFC module 512 can be used to provide NFC communications for various types of applications (as described herein).

The Bluetooth transceiver 510 can provide Bluetooth communications with the mobile device 502. For example, there can be Bluetooth communications between the mobile device 502 and a wagering game machine, between the mobile device 502 and another mobile device, etc. In some applications, the NFC communications can be used to exchange data to configure the pairing of the mobile device 502 with another device (e.g., a wagering game machine) for Bluetooth communication. The data can include the parameters for the communication, password, secret key, etc. Subsequently, the Bluetooth communication can be used to provide communication between the mobile device and the other device. The Bluetooth communication can be based on Bluetooth v1.0, Bluetooth v1.0B, Bluetooth v1.1, Bluetooth v1.2, Bluetooth v2.0+Enhanced Data Rate (EDR), Bluetooth v2.1+EDR, Bluetooth v3.0+HS, Bluetooth v4.0, Bluetooth low energy, etc.

The cellular transceiver 514 can provide cellular communication with the mobile device 502. With reference to FIG. 1, the cellular transceiver 514 can be used to provide communications the different backend servers over the network 112. The cellular communication can be based on Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), Integrated Digital Enhanced Network (iDEN), Long Term Evolution (LTE), Worldwide Interoperability for Microwave Access (WiMax), etc.

Example Operations

This section describes operations associated with some example embodiments. In the discussion below, the flowcharts will be described with reference to the block diagrams presented above. However, in some example embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some example embodiments, the operations can be performed in series, while in other embodiments, one or more of the operations can be performed in parallel. Moreover, some example embodiments can perform less than all the operations shown in any flowchart.

Figure 6:
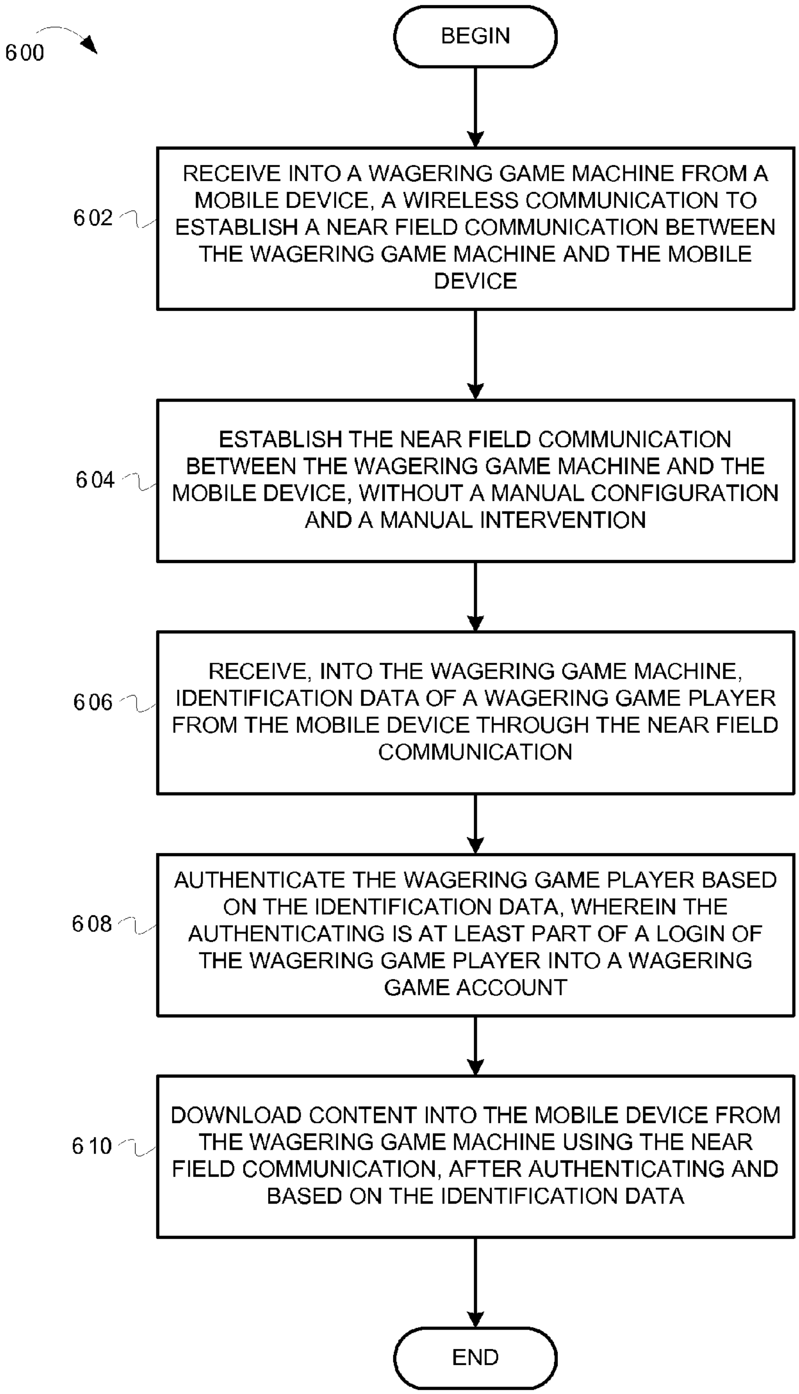
FIG. 6 depicts a flowchart for communication between a mobile device and a wagering game machine using NFC communication, according to some example embodiments.
Figure 7:
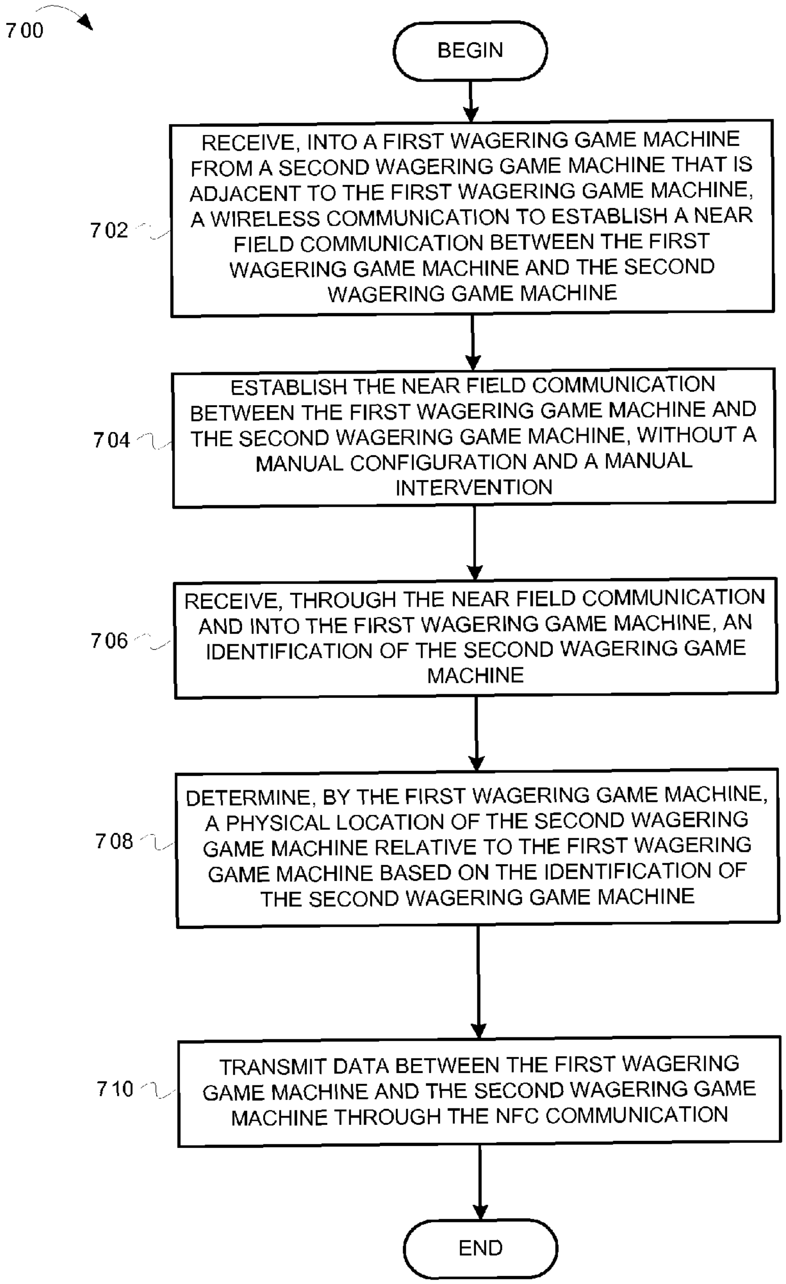
FIG. 7 depicts a flowchart for communication between two different wagering game machines using NFC communication, according to some example embodiments.

The section will discuss FIGS. 6-7. The discussion of FIG. 6 will describe example operations for mobile device to wagering game machine communication using NFC communication. The discussion of FIG. 7 will describe example operations for wagering game machine to wagering game machine communication using NFC communication.

In particular, FIG. 6 depicts a flowchart for communication between a mobile device and a wagering game machine using NFC communication, according to some example embodiments. In this example, operations of a flowchart 600 are performed by different components of the wagering game machine 102 of FIG. 1. The flowchart 600 illustrates operations that provides for bi-directional communication using NFC communication between the mobile device and the wagering game machine. As described above, the NFC communication can be limited to one direction in some applications. The operations of the flowchart 600 begin at block 602.

At block 602, the NFC module 118 receives into the wagering game machine 102 from the mobile device, a wireless communication to establish a NFC communication between the wagering game machine 102 and the mobile device 108. As described above and in reference to FIG. 1, the NFC communication protocol is such that this initial wireless communication to establish the NFC communication is created when the wagering game player 190 positions the mobile device 108 at a close enough distance such that the NFC module 118 receives this initial wireless communication. For example, the NFC module within the mobile device and the NFC module 118 can periodically send out this pinging communications to determine whether another NFC-compatible device is within range. Also, as described above, the distance is generally consider short relative to other types of wireless communications (e.g., less than six inches, less than 12 inches, less than 36 inches, etc.). The operations of the flowchart 600 continue at block 604.

At block 604, the NFC module 118 establishes the NFC communication between the wagering game machine 102 and the mobile device 108, without a manual configuration and a manual intervention. With reference to FIG. 1, the NFC module 118 establishes the communication with a corresponding NFC module in the mobile device 108 (see FIG. 5) without any user configuration or intervention. For example and in contrast to Bluetooth, there is no requirement of that the mobile device be placed into a pairing mode by the user, that a certain button be held down for an extended period, etc. in order to establish the NFC communication. Rather, the two NFC modules establish the NFC communication after being in close proximity to each other. In some example embodiments, applications running on top of the NFC communication can create additional layers of security for the communications (e.g., encryption/decryption, etc.). The operations of the flowchart 600 continue at block 606.

At block 606, the NFC module 118 receives, into the wagering game machine 102, identification data of a wagering game player from the mobile device 108 through the NFC communication. With reference to FIG. 1, the mobile device 108 can store an identification of the person associated there with. In this example, the mobile device 108 is associated with the wagering game player 190. The identification can be the person's name, username, etc. This identification data can be stored in a nonvolatile machine-readable media in the mobile device 108. In some example embodiments, the NFC module 118 can be configured to request this identification data, in response to establishing an NFC communication with a mobile device. The operations of the flowchart 600 continue at block 608.

At block 608, the wagering game module 123 authenticates the wagering game player based on the identification data, wherein the authenticating is at least part of a login of the wagering game player into a wagering game account. With reference to FIG. 1, the wagering game module 123 can receive the identification of the wagering game player 190 from the NFC module 118. The wagering game module 123 can also receive a password inputted by the wagering game player 190 at either the mobile device 108 or the wagering game machine 102. The wagering game module 123 can then authenticate the wagering game player 190 to enable the wagering game player 190 to login into one or more of their accounts. Alternatively or in addition, the wagering game module 123 can transmit the identification data, password, etc. to one or more of the backend servers over the network 110. The modules in the backend servers can then authenticate the wagering game player 190 and return an indication back to the wagering game module 123. The wagering game module 123 can then enable the wagering game player 190 to access one of more of their accounts if they are authenticated. For example, the processing module 124 in the wagering game establishment server 104 can authenticate the wagering game player 190 to enable account-based wagering at the wagering game machine 102 (based on the account of the wagering game player 190 after authentication). The operations of the flowchart 600 continue at block 610.

At block 610, the NFC module 118 downloads content into the mobile device 108 from the wagering game machine 102 using the NFC communication, after authenticating and based on the identification data. For example, the content being downloaded can be both static and dynamic content. To illustrate, if the wagering game player 190 is playing game A, the wagering game machine 102 can download content specific to the game A (pay tables, help content, etc.) through the NFC communication. The help content can include any combination of text, audio and video. Dynamic content can include game play statistics, leader boards, achievements earned by the player or friends of the player, amount of money put into the machine versus the amount of money won, etc. Other content to be downloaded through the NFC communication includes targeted content (e.g., advertising, comps, etc.) to the specific wagering game player. The operations of the flowchart 600 are complete.

The operations described by the flowchart 600 are some examples of using NFC communication for communication between a mobile device and a wagering game machine. Other types of communication can occur using this NFC communication, as described above.

FIG. 7 depicts a flowchart for communication between two different wagering game machines using NFC communication, according to some example embodiments. In this example, operations of a flowchart 700 are performed by different components of the wagering game machine 202 of FIG. 2. The flowchart 700 is also described in reference to FIG. 3. The flowchart 700 illustrates operations that provides for bi-directional communication using NFC communication between two different wagering game machines. As described above, the NFC communication can be limited to one direction in some applications. The example operations in the flowchart 700 are in reference to one set of two wagering game machines. These operations can be performed between multiple sets of two wagering game machines. For example in one application, these operations can be performed across multiple sets of two wagering game machines in a bank of wagering game machines (as described above). The operations of the flowchart 700 begin at block 702.

At block 702, the NFC module 204 receives, into a first wagering game machine from a second wagering game machine that is adjacent to the first wagering game machine, a wireless communication to establish an NFC communication between the first wagering game machine and the second wagering game machine. With reference to FIG. 3, the NFC module on the left side of the wagering game machine 304 receives a wireless communication to establish an NFC communication from the NFC module on the right side of the wagering game machine 302 (to establish an NFC communication between the wagering game machine 302 and the wagering game machine 304). As described above, the NFC communication protocol is such that this initial wireless communication to establish the NFC communication is created when the two wagering game machines are at a close enough distance such that the two NFC modules receive this initial wireless communication. For example, the NFC modules within the two different wagering game machines can periodically send out this pinging communications to determine whether another NFC-compatible device is within range. Also, as described above, the distance is generally consider short relative to other types of wireless communications (e.g., less than six inches, less than 12 inches, less than 36 inches, etc.). The operations of the flowchart 700 continue at block 704.

At block 704, the NFC module 204 establish the Near Field Communication between the first wagering game machine and the second wagering game machine, without a manual configuration and a manual intervention. With reference to FIG. 3, the NFC module on the left side of the wagering game machine 304 establishes the communication with a corresponding NFC module on the right side of the wagering game machine 302 without any user configuration or intervention. For example and in contrast to Bluetooth, there is no requirement of that either of the wagering game machines be placed into a pairing mode by a user, that a certain button be held down for an extended period, etc. in order to establish the NFC communication. Rather, the two NFC modules establish the NFC communication after being in close proximity to each other. In some example embodiments, applications running on top of the NFC communication can create additional layers of security for the communications (e.g., encryption/decryption, etc.). The operations of the flowchart 700 continue at block 706.

At block 706, the NFC module 204 receives, through the Near Field Communication and into the first wagering game machine, an identification of the second wagering game machine. With reference to FIG. 3, each of the wagering game machines 302-308 can store an identification (e.g., serial number, network address, etc.) of itself in a machine-readable medium therein. In some example embodiments, the NFC modules in the wagering game machines 302-308 can be configured to request this identification of the other wagering game machine, in response to establishing an NFC communication with this other wagering game machine. The operations of the flowchart 700 continue at block 708.

At block 708, the NFC module 204 determine, by the first wagering game machine, a physical location of the second wagering game machine relative to the first wagering game machine based on the identification of the second wagering game machine. With reference to FIG. 3, after the exchange of identifications using NFC communication, the wagering game machine 302 determines that the wagering game machine 304 is positioned to its right side. The wagering game machine 304 determines that the wagering game machine 302 is positioned to its left side and that the wagering game machine 306 is positioned to its right side. The wagering game machine 306 determines that the wagering game machine 304 is positioned to its left side and that the wagering game machine 308 is positioned to its right side. The wagering game machine 308 determines that the wagering game machine 306 is positioned to its left side. The operations of the flowchart 700 continue at block 710.

At block 710, the NFC module 204 transmits data between the first wagering game machine and the second wagering game machine through the NFC communication. With reference to FIG. 3, the different wagering game machines can exchange different types of data using the NFC communication. As described above, these different types of data can include data to coordinate celebrations (e.g., type of celebration, timing signals, etc.), data to instruct a wagering game machine to download certain content (e.g., an instruction to download, the network address of the host device from which to download the content, etc.). The operations of the flowchart 700 are complete.

Some or all of these operations of the flowchart 700 can be repeated after a new wagering game machine is added or replaces an existing wagering game machine on the floor of a wagering game establishment.

Operating Environment

This section describes an example operating environment and presents structural aspects of some embodiments. This section includes discussion about wagering game machine architectures and wagering game networks.

Wagering Game Machine Architectures

Figure 8:
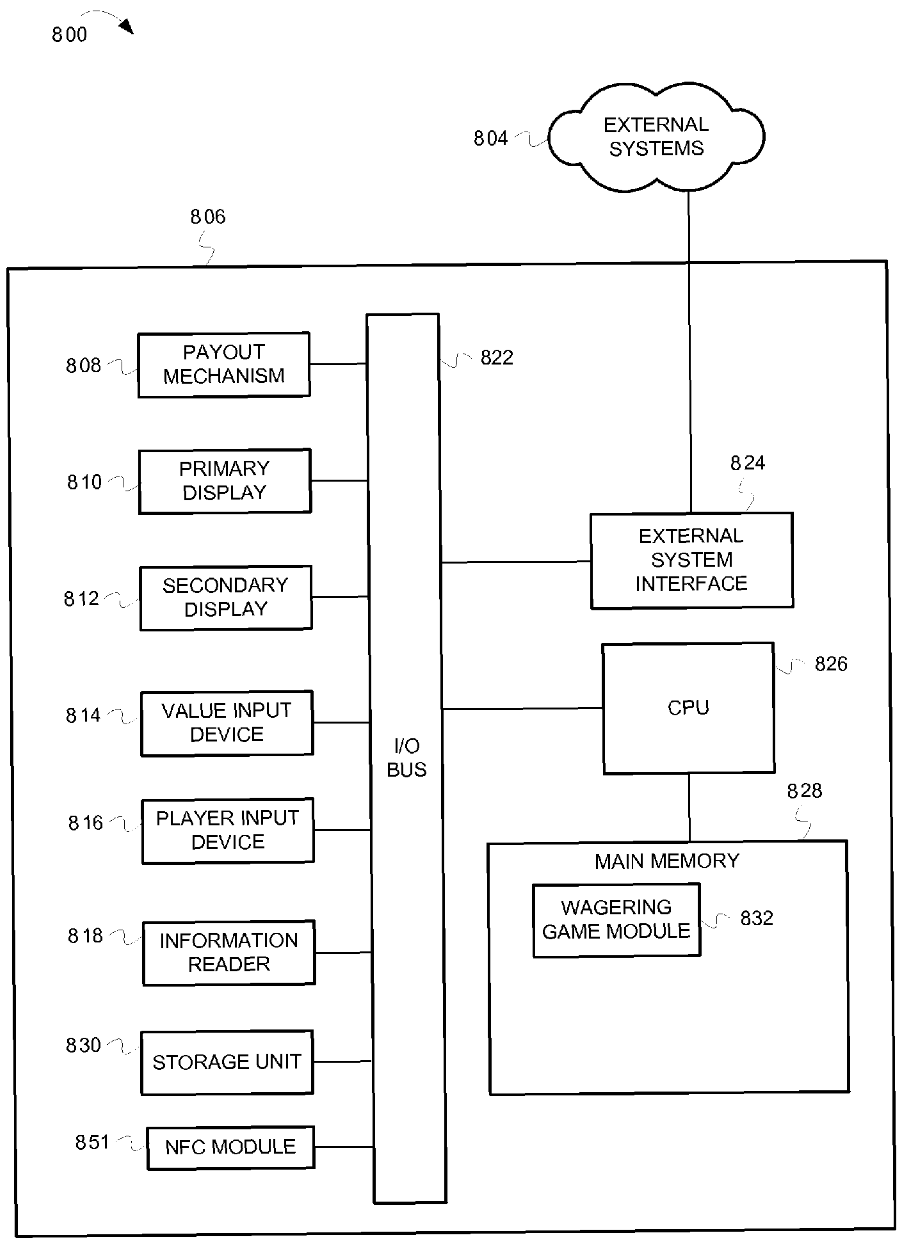
FIG. 8 is a block diagram illustrating a wagering game machine architecture, according to some example embodiments.

FIG. 8 is a block diagram illustrating a wagering game machine architecture, according to some example embodiments. As shown in FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game module 832. In one embodiment, the wagering game module 832 can present wagering games, such as video poker, video black jack, video slots, video lottery, etc., in whole or part. The wagering game module 832 can also process the NFC communications received and transmitted (as described above). While described such that a same module performs these different operations, in some other example embodiments, different modules perform the different operations (e.g., module A presents the wagering games and module B performs the operations related to the NFC communication).

The CPU 826 is also connected to an input/output (I/O) bus 822, which can include any suitable bus technologies, such as an AGTL+frontside bus and a PCI backside bus. The I/O bus 822 is connected to a payout mechanism 808, primary display 810, secondary display 812, value input device 814, player input device 816, information reader 818, and storage unit 830 and NFC module 851. The player input device 816 can include the value input device 814 to the extent the player input device 816 is used to place wagers. The I/O bus 822 is also connected to an external system interface 824, which is connected to external systems 804 (e.g., wagering game networks).

In one embodiment, the wagering game machine 806 can include additional peripheral devices and/or more than one of each component shown in FIG. 8. For example, in one embodiment, the wagering game machine 806 can include multiple external system interfaces 824 and/or multiple CPUs 826. In one embodiment, any of the components can be integrated or subdivided.

Any component of the architecture 800 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 8 describes an example wagering game machine architecture, this section continues with a discussion wagering game networks.

Wagering Game Networks

Figure 9:
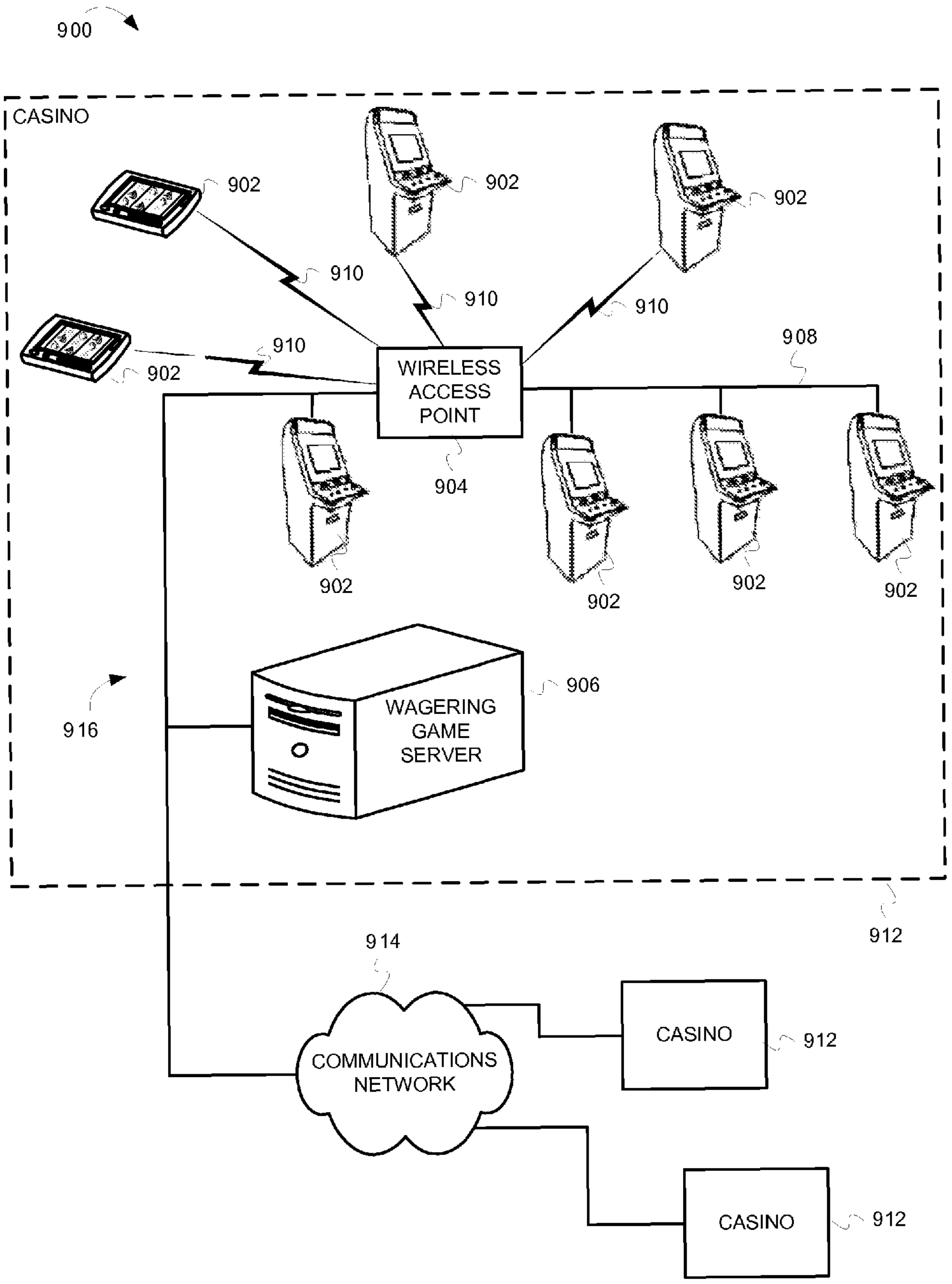
FIG. 9 is a block diagram illustrating a wagering game network 900, according to some example embodiments.

FIG. 9 is a block diagram illustrating a wagering game network 900, according to some example embodiments. As shown in FIG. 9, the wagering game network 900 includes a plurality of casinos 912 connected to a communications network 914.

Each casino 912 includes a local area network 916, which includes an access point 904, a wagering game server 906, and wagering game machines 902. The access point 9304 provides wireless communication links 910 and wired communication links 908. The wired and wireless communication links can employ any suitable connection technology, such as Bluetooth, 802.11, Ethernet, public switched telephone networks, SONET, etc. In some embodiments, the wagering game server 906 can serve wagering games and distribute content to devices located in other casinos 912 or at other locations on the communications network 914. In some example embodiments, the wagering game server 906 is representative of one of more of the backend servers illustrated in FIG. 1.

The wagering game machines 902 described herein can take any suitable form, such as floor standing models, handheld mobile units, bartop models, workstation-type console models, etc. Further, the wagering game machines 902 can be primarily dedicated for use in conducting wagering games, or can include non-dedicated devices, such as mobile phones, personal digital assistants, personal computers, etc. In one embodiment, the wagering game network 900 can include other network devices, such as accounting servers, wide area progressive servers, player tracking servers, and/or other devices suitable for use in connection with embodiments of the invention.

In some embodiments, wagering game machines 902 and wagering game servers 906 work together such that a wagering game machine 902 can be operated as a thin, thick, or intermediate client. For example, one or more elements of game play may be controlled by the wagering game machine 902 (client) or the wagering game server 906 (server). Game play elements can include executable game code, lookup tables, configuration files, game outcome, audio or visual representations of the game, game assets or the like. In a thin-client example, the wagering game server 906 can perform functions such as determining game outcome or managing assets, while the wagering game machine 902 can present a graphical representation of such outcome or asset modification to the user (e.g., player). In a thick-client example, the wagering game machines 902 can determine game outcomes and communicate the outcomes to the wagering game server 906 for recording or managing a player's account.

In some embodiments, either the wagering game machines 902 (client) or the wagering game server 906 can provide functionality that is not directly related to game play. For example, account transactions and account rules may be managed centrally (e.g., by the wagering game server 906) or locally (e.g., by the wagering game machine 902). Other functionality not directly related to game play may include power management, presentation of advertising, software or firmware updates, system quality or security checks, etc.

Any of the wagering game network components (e.g., the wagering game machines 902) can include hardware and machine-readable media including instructions for performing the operations described herein.

Example Wagering Game Machine

Figure 10:
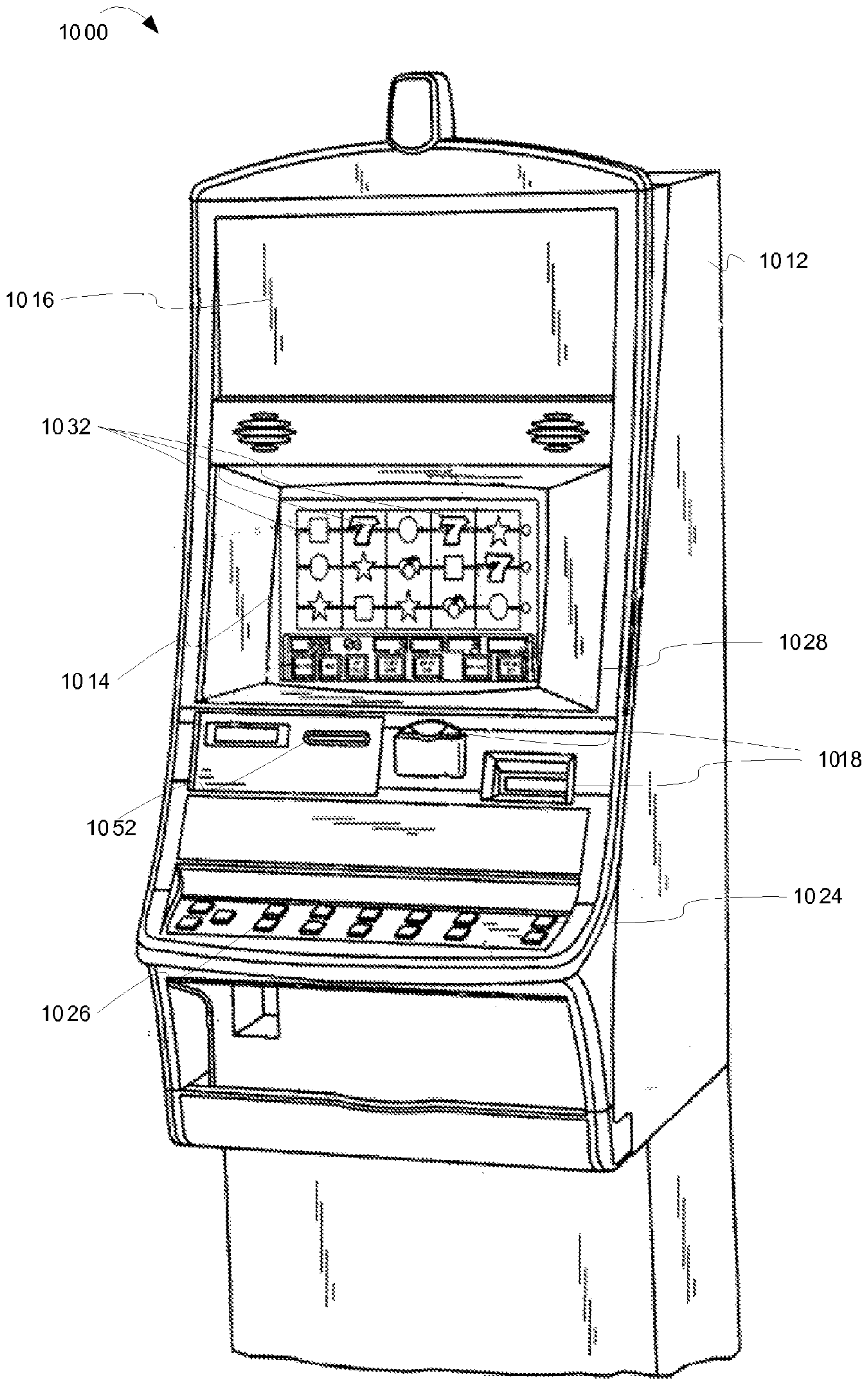
FIG. 10 is a perspective view of a wagering game machine, according to some example embodiments.

FIG. 10 is a perspective view of a wagering game machine, according to some example embodiments. Referring to FIG. 10, a wagering game machine 1000 is used in gaming establishments, such as casinos. According to embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bartop model, mobile handheld model, or workstation console model.

A player begins playing a basic wagering game by making a wager via the value input device 1018. The player can initiate play by using the player input device's buttons or touch screen 1028. The basic game can include arranging a plurality of symbols along a payline 1032, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

establishing a Near Field Communication between a wagering game machine and a mobile device, without a manual configuration and a manual intervention;

receiving, into the wagering game machine, player identification data from the mobile device through the Near Field Communication;

authenticating the player identification data, wherein the authenticating is at least part of a player login into a wagering game account, transmitting the player identification data to a backend server that is communicatively coupled to the wagering game machine; and after authenticating and in response to receipt of the player identification data by the backend server, providing by the backend server to the mobile device content through a different wireless communication that does not include the Near Field Communication and does not include the wagering game machine.

2. The method of claim 1, wherein a distance between the mobile device and the wagering game machine is less than 12 inches.

3. The method of claim 1, further comprising downloading content into the mobile device from the wagering game machine using the Near Field Communication, after authenticating and based on the player identification data.

4. The method of claim 1, further comprising:

performing account-based wagering in the wagering game machine after authenticating and based on the player identification data.

5. A method comprising:

receiving, into a first wagering game machine from a second wagering game machine that is adjacent to the first wagering game machine, a Near Field Communication to establish a wireless communication between the first wagering game machine and the second wagering game machine;

establishing the Near Field Communication between the first wagering game machine and the second wagering game machine, without a manual configuration and a manual intervention;

receiving, through the Near Field Communication and into the first wagering game machine, an identification of the second wagering game machine; and determining, by the first wagering game machine, a physical location of the second wagering game machine relative to the first wagering game machine based on the identification of the second wagering game machine received through the Near Field Communication.

6. The method of claim 5, wherein the first wagering game machine and the second wagering game machine are part of a bank of wagering game machines, wherein a celebration at one of the wagering game machines in the bank of wagering game machines is spread across the bank of wagering game machines, wherein the method comprises:

receiving, through the Near Field Communication into the first wagering game machine from the second wagering game machine, an identification of a type of the celebration and a time value to coordinate a timing of the celebration; and creating the celebration at the first wagering game machine in coordination with the bank of wagering game machines based on the identification of the type of celebration and the time value received through the Near Field Communication.

7. The method of claim 5, further comprising:

receiving, through the Near Field Communication by the first wagering game machine and from the second wagering game machine, a network address of a host device that is storing content;

receiving, through the Near Field Communication by the first wagering game machine and from the second wagering game machine, an instruction to download the content from the host device; and downloading, by the first wagering game machine, the content from the host device, in response to receiving the instruction and based on the network address of the host device.

8. The method of claim 7, wherein the downloading of the content from the host device comprises downloading of the content from the host device using a wired communication.

9. A wagering game machine comprising:

a processor;

a wagering game module, executable on the processor, configured to present a wagering game on which monetary value can be wagered to a wagering game player; and a communication module communicatively coupled to the processor, wherein the communication module is configured to, receive, from a mobile device, a wireless communication between the wagering game machine and the mobile device based on a communication protocol wherein the mobile device and the wagering game machine are required to within 12 inches of each other;

establish the wireless communication between the wagering game machine and the mobile device;

receive identification data of the wagering game player from the mobile device through the wireless communication, wherein the wagering game player is authenticated based on the identification data, wherein the authentication is at least part of a login of the wagering game player into a wagering game account; and transmit the identification data to a backend server that is communicatively coupled to the wagering game machine, wherein after authentication and in response to receipt of the identification data by the backend server, the backend server is configured to transmit content to the mobile device through a different wireless communication that does not include the wireless communication and does not include the wagering game machine.

10. The wagering game machine of claim 9, wherein the communication protocol comprises Near Field Communication.

11. The wagering game machine of claim 9, wherein the communication module is configured to download content into the mobile device from the wagering game machine using the wireless communication.

12. The wagering game machine of claim 9, wherein the wagering game module is configured to perform account-based wagering in the wagering game machine after the authentication and based on the identification data.

13. A wagering game machine comprising:

a processor;

a wagering game module, executable on the processor, configured to present a wagering game on which monetary value can be wagered to a wagering game player; and a Near Field Communication module communicatively coupled to the processor, wherein the Near Field Communication module is configured to, receive, from a different wagering game machine that is adjacent to the wagering game machine, a wireless communication to establish a Near Field Communication between the wagering game machine and the different wagering game machine;

receive, through the Near Field Communication, an identification of the different wagering game machine, wherein a physical location of the different wagering game machine is determined relative to the wagering game machine based on the identification of the different wagering game machine based on the Near Field Communication received by the Near Field Communication module.

14. The wagering game machine of claim 13, wherein the wagering game machine and the different wagering game machine are part of a bank of wagering game machines, wherein a celebration at one of the wagering game machines in the bank of wagering game machines is spread across the bank of wagering game machines, wherein the Near Field Communication module is configured to receive, through the Near Field Communication from the different wagering game machine, an identification of a type of the celebration and a time value to coordinate a timing of the celebration; and wherein the wagering game module is configured to create the celebration at the wagering game machine in coordination with the bank of wagering game machines based on the identification of the type of celebration and the time value received through the Near Field Communication.

15. The wagering game machine of claim 14, wherein the celebration comprises at least one of sound, lighting and video.

16. The wagering game machine of claim 13, wherein the Near Field Communication module is configured to receive, through the Near Field Communication and from the different wagering game machine, a network address of a host device that is storing content;

wherein the Near Field Communication module is configured to receive, through the Near Field Communication and from the different wagering game machine, an instruction to download the content from the host device; and wherein the wagering game module is configured to download, the content from the host device, in response to receiving the instruction and based on the network address of the host device.

17. The wagering game machine of claim 16, wherein the wagering game module is configured to download the content from the host device using a wired communication.

18. An apparatus comprising:

means for establishing a Near Field Communication between a wagering game machine and a mobile device, without a manual configuration and a manual intervention;

means for receiving, into the wagering game machine, player identification data from the mobile device through the Near Field Communication; and means for authenticating the player identification data, wherein the means for authenticating is at least part of a player login into a wagering game account; and means for transmitting the player identification data to a backend server that is communicatively coupled to the wagering game machine, wherein after the authentication and in response to receipt of the player identification data by the backend server, the backend server transmits content to the mobile device through a different wireless communication that does not include the Near Field Communication and does not include the wagering game machine.

19. The apparatus of claim 18, wherein a distance between the mobile device and the wagering game machine is less than 12 inches.

20. The apparatus of claim 18, further comprising means for downloading content into the mobile device from the wagering game machine using the Near Field Communication, after authentication and based on the identification data.

21. The apparatus of claim 18, further comprising means for performing account-based wagering in the wagering game machine after authenticating and based on the player identification data.

* * * * *